UNITED STATES PATENT OFFICE.

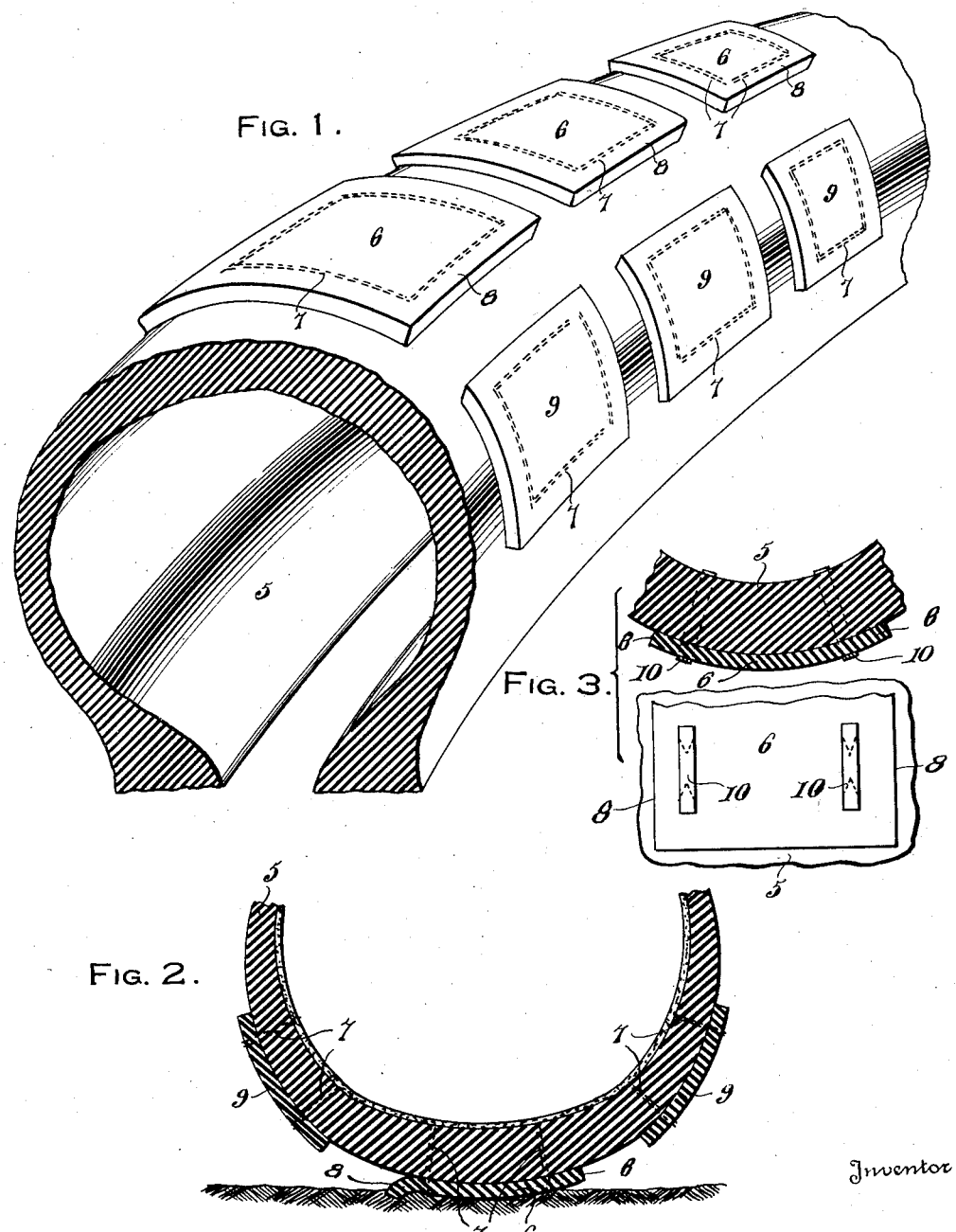

WILLIAM E. RUSSELL, OF AKRON, OHIO.

ELASTIC VEHICLE-TIRE.

1,345,256.

Specification of Letters Patent.  Patented June 29, 1920.

Application filed August 18, 1919. Serial No. 318,140.

*To all whom it may concern:*

Be it known that I, WILLIAM E. RUSSELL, a citizen of the United States, residing at Akron, in the county of Summit and State of Ohio, have invented new and useful Improvements in Elastic Vehicle-Tires, of which the following is a specification.

This invention relates to certain new and useful improvements in pneumatic tire shoes and contemplates the reinforcement of ordinary tire shoes by the employment of means which additionally prevents skidding.

The invention is carried out by the riveting or sewing of patches at intervals around the tire shoe so as to leave the margins of said patches free to turn up for the purpose of resisting skidding.

With the above general construction in view, the invention consists in the novel form, combination and arrangement of parts hereinafter more fully described, shown in the accompanying drawing and claimed.

In the drawing,

Figure 1 is a perspective view of a portion of a tire shoe with patches secured thereon in accordance with the present invention, Fig. 2 is a transverse sectional view, partly broken away, of the device shown in Fig. 1, and illustrating the action of one of the patches in preventing skidding, and Fig. 3 shows the attachment of the patches by means of rivets in fragmentary sectional and plan views.

Referring more in detail to the several views, 5 indicates the usual form of outer shoe for pneumatic tires which, in accordance with the present invention, is provided with a number of patches 6 upon the tread portion thereof at suitable intervals, said patches being secured in position by the stitching 7 so as to leave the margins 8 of the patches free.

Further patches 9 are similarly secured to the shoe 5 at opposite sides of the tread portion thereof which are brought into action in case the tire is partially deflated.

As shown in Fig. 3 the patches 6 and 9 may be fastened to the tire shoe 5 by means of staples or rivets 10.

In operation, the margins of the patches 6 and 9 engage the ground in an obvious manner to prevent skidding and the provision of a large number of these patches causes a strengthening of the tire shoe. In other words, the patches greatly reinforce weak or cheap new tires and give longer life to old ones. They also add to the tension in starting (whether forward or backward), on inclines, hills, snow and ice, and make extrication from mud holes comparatively easy, while side skidding is practically prevented.

What I claim as new is:—

1. The combination with a conventional pneumatic tire shoe of a plurality of flat patches secured at intervals around said shoe whereby the margins of said patches are free to turn up for preventing skidding.

2. The combination with the usual pneumatic tire shoe, of a plurality of patches secured at intervals around the tread portion of said shoe with the margins of the patches free, and a plurality of similar patches similarly secured to the tire shoe at opposite sides of the tread portion thereof.

3. The combination with the usual pneumatic tire shoe, of a plurality of patches secured at intervals around the tread portion of said shoe by stitching so as to leave the margins of said patches free.

In testimony whereof I have hereunto set my hand.

WILLIAM E. RUSSELL.